United States Patent [19]
Harte

[11] 3,964,176  
[45] June 22, 1976

[54] INSTRUCTIONAL APPARATUS WITH MOVABLE BLANK SHEET

[76] Inventor: James Richard Harte, 10 W. Concord, Kansas City, Mo. 64112

[22] Filed: Oct. 15, 1974

[21] Appl. No.: 514,492

[52] U.S. Cl. .................................. 35/9 R; 35/48 A
[51] Int. Cl.² .......................................... G09B 3/08
[58] Field of Search ................. 35/48 R, 48 A, 9 R, 35/9 C, 9 E, 31 C

[56] References Cited
UNITED STATES PATENTS

| | | | |
|---|---|---|---|
| 3,174,231 | 3/1965 | Schure | 35/9 E X |
| 3,177,595 | 4/1965 | Yonkers et al. | 35/48 R |
| 3,579,864 | 5/1971 | Littwin | 35/9 C |
| 3,696,526 | 10/1972 | Roeder et al. | 35/31 C X |
| 3,747,229 | 7/1973 | Harte | 35/9 R |

Primary Examiner—John H. Wolff
Attorney, Agent, or Firm—D. A. N. Chase

[57] ABSTRACT

The invention relates to an instructional apparatus in which a holding mechanism has depressions in its upper surface of two different depths, means being provided to hold a printed format containing selected areas indicating answer choices on the upper surface of the holding mechanism. The selected areas in the format are arranged to align with the depressions and are defined by holes through the printed sheet. A blank response sheet is sandwiched between the printed format and the upper surface of the holding mechanism. The user pushes a stylus through the selected hole, and thence through the blank response sheet and into the underlying depression. If he has selected the correct answer the stylus will make a large hole in the blank sheet because the correct selections are above deep depressions whereas incorrect answer selections are above shallow depressions. The blank response sheet, therefore, provides a permanent indication of right and wrong answers since right answers will show up as large holes in the sheet and wrong answers will show up as small holes. The blank response sheet may be part of a roll of paper carried by rollers positioned at opposite sides of the holding mechanism so that the response sheet can be incrementally shifted to enable the printed format to be used a second and subsequent times.

7 Claims, 3 Drawing Figures

INSTRUCTIONAL APPARATUS WITH MOVABLE BLANK SHEET

This invention relates to an instructional apparatus of the kind comprising a holding mechanism having on its upper surface holes or depressions of at least two different depths and a printed format containing selected areas indicating answer choices, and means to hold the printed format on the upper surface of the holding mechanism so that the selected areas in the format align with the holes or depressions in the upper surface of the holding mechanism.

Such an instructional apparatus is described in my co-pending U.S. patent application, Ser. No. 443,703, filed Feb. 19, 1974. In that application the printed format does not have holes in it, the user making his own holes by pushing the stylus through selected areas of the format which he hopes correspond to the right answers.

In accordance with the present invention the selected areas for indicating answer choices are replaced by holes and a blank response sheet is adapted to be positioned between the printed format and the upper surface of the holding mechanism. By having holes in the format it is possible to use and reuse the printed format many times simply by replacing the blank response sheet or moving it between each use of the printed format.

The invention will now be explained in more detail. The printed formats contain information on their upper surface which includes questions and two or more possible correct answers for each question. Possible correct answers are printed on the formats near holes punched or drilled through the surface of the printed formats.

The blank sheet of paper or similar material in which responses are registered normally lies between the printed formats and the underlying holding mechanism. This registration sheet obscures the holes or depressions in the holding mechanism that lie directly under the holes in the printed formats when the printed formats are properly positioned or aligned. When the student thinks he knows the correct response, he pushes the tip of a stylus through the hole in the printed format that he feels corresponds to the right answer. In the same movement the student also pushes the tip of a stylus through the blank registration sheet that underlies the printed format. The blank registration sheet is in close apposition to the printed format. The depth of penetration, or the size, shape, or other configuration of hole produced in this registration sheet by the stylus indicates the correctness or degree of correctness of the student's response. After one student has responded to all of the questions on the printed format, the blank registration sheet is then either replaced or moved a short distance. The blank registration sheet may be advanced by lifting a corner of the overlying printed format and manually repositioning the registration sheet. Or the blank registration sheet may be advanced within the holding frame without removing the overlying printed format(s). Movement of the blank registration sheet a short distance causes new and unperforated surfaces to appear through the holes in the printed formats. When unperforated surfaces appear through the holes in the printed formats the total apparatus can then be responded to again by the same student, or by a different student. A wide variety of printed formats may be printed on paper or on opaque plastic sheets. Printed formats are reusable. The blank registration sheet may vary considerably in length. If the blank registration sheet is of sufficient length, it may be used as a roll that is dispensed from one roller and taken up on another roller.

It is felt that this invention has two advantages over the previous art. The first advantage is that in normal use one consumes only unprinted paper which can be reused a number of times, this allows for a relatively inexpensive operation. (Strips of newspaper cut into appropriate widths and lengths can be used in place of unprinted paper to further lower the cost of operation.) A second advantage is that if long movable strips of paper are used as blank registration sheets it is not necessary to repeatedly remove the printed format from the holding mechanism. By pulling a blank registration sheet through the space between the printed format and the holding mechanism in small steps to expose unused surfaces through the holes in the printed formats, the student or teacher does not have to remove and replace the blank registration sheet after each single use of the printed format. In the classromm this would allow a large number of students to use the same format without taking it out of the holding frame by merely advancing the blank registration sheet a short distance after each use. The blank registration sheet is advanced each time only as far as is needed to obscure all perforations that may be showing through the holes in the printed formats.

The following figures illustrate the details outlined in the previous description:

FIG. 2 also shows how the stylus produces different sized holes in the blank registration sheet.

Figure 1:
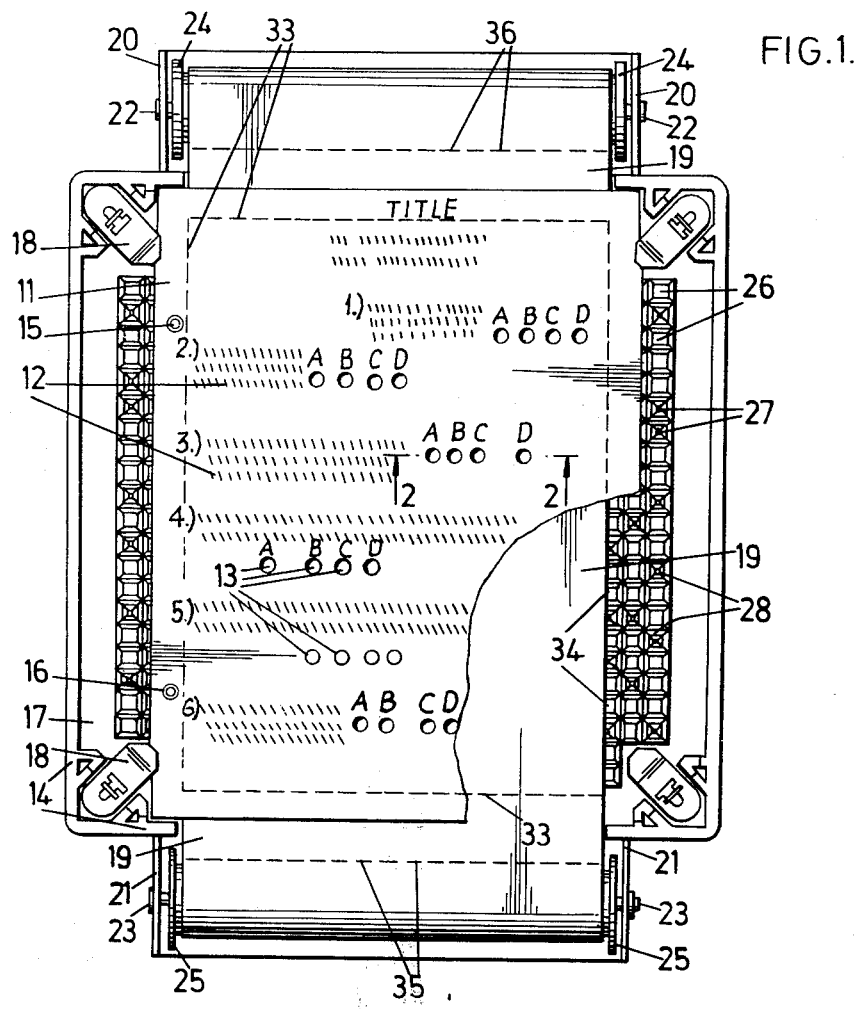
FIG. 1 is a top view of the apparatus which includes a printed format correctly positioned on top of a blank registration sheet, both of which are held and aligned within the holding mechanism. The holding mechanism has a grid of holes of different depths on its upper surface.

In FIG. 1, 11 is a printed format which contains printed material 12 and through holes 13. Printed material 12 presents information, questions, and a selection of possible correct responses A, B, C, and D. Printed format 11 is held in proper alignment at its corners by elevated outside rim 14 of holding mechanism 17. Printed format 11 is positioned so that its two alignment holes fit over alignment pins 15 and 16. Alignment pins 15 and 16 are an integral part of holding mechanism 17. Printed format 11 is held onto the upper surface of holding mechanism 17 by hold down clamps 18. Blank registration sheet 19 is positioned between printed format 11 and the upper surface of holding mechanism 17. Extending from opposite sides of holding mechanism 17 are roller supports 20 and 21, that support axles 22 and 23 which hold rollers 24 and 25 in position. Blank registration sheet 19 can be taken up on one roller while being unwound from the other roller without removing printed format 11.

Elevated outside rim 14 extends upward from holding mechanism 17 except in the two areas in which registration sheet 19 passes back and forth across the edge of holding mechanism 17. In the edge areas where a long blank registration sheet 19 passes back and forth across the edge, an elevated external rim would obstruct free movement of the long blank registration sheet. Three types of blank registration sheets are illustrated, a short one outlined by dotted line 33 and uninterrupted line 34; a long one illustrated as extending beyond the edges of the holding mechanism 17 and being rolled up on rollers 24 and 25; and one of intermediate length extending from dotted line 35 to dotted line 36. Rollers 24 and 25 allow the long blank registration sheet 19 to be advanced a short distance by manually rotating one of the rollers. The intermediate length blank registration sheet 19 can be manually advanced without removing overlying printed format 11 by pulling the sheet at edge 35, or along edge 36.

Dotted line 33 and uniterrupted line 34 outline a small rectangular registration sheet 19 that is smaller in length and width than printed format 11. Small blank registration sheet 19 can be moved about on the upper surface of holding mechanism 17 by lifting one or two of the corners of printed format 11 and manually repositioning this sheet after each use.

This ability to reposition blank registration sheet 19 by any of the three means given above provides for a saving in paper and an ease of operation. Each useful repositioning of blank registration sheet 19 will allow fresh or unperforated surfaces to appear through holes 13 of printed format 11.

Holding mechanism 17 has a grid of ridges 28 on its upper surface. This grid of ridges 28 provides the upper lateral boundaries for shallow areas 26, and deep holes 27.

Figure 2:
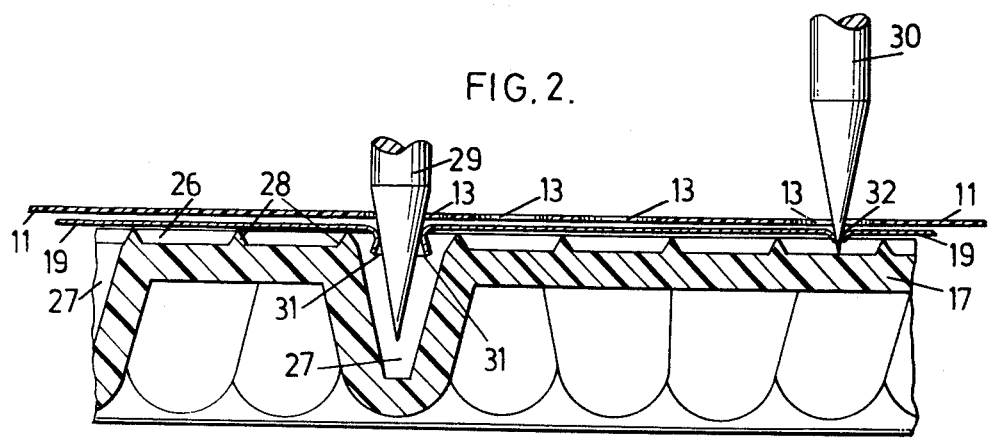
FIG. 2 is a cross section — cutaway view along line 2—2 of FIG. 1 showing the vertical relationships of the printed format and blank registration sheet to the upper surface of the holding mechanism.

FIG. 2 is an enlarged partial cutaway view of FIG. 1 along line 2—2. FIG. 2 shows the relationship of printed format 11 to blank registration sheet 19, and to ridges 28, shallow areas 26, and deep holes 27. Stylus 29 and stylus 30 are shown with their points passing through holes 13 in printed format 11 and penetrating blank registration sheet 19 to produce large hole 31 and small hole 32. Stylus 29 and stylus 30 have cone shaped tips. The deeper the penetration of the stylus, the larger the hole produced. Large holes represent correct (or incorrect) responses.

Figure 3:
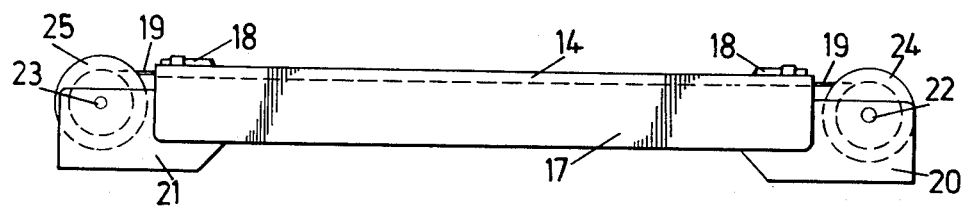
FIG. 3 is a side view of FIG. 1, and shows one means of advancing a long blank registration sheet by means of putting it in a roll and using rollers.

FIG. 3 is a side view of FIG. 1 and shows the relationship of holding mechanism 17; to elevated outside rim 14; to roller supports 20 and 21; to hold down clamps 18; to registration sheet 19; to rollers 24 and 25, and to axles 22 and 23.

Figure 4:
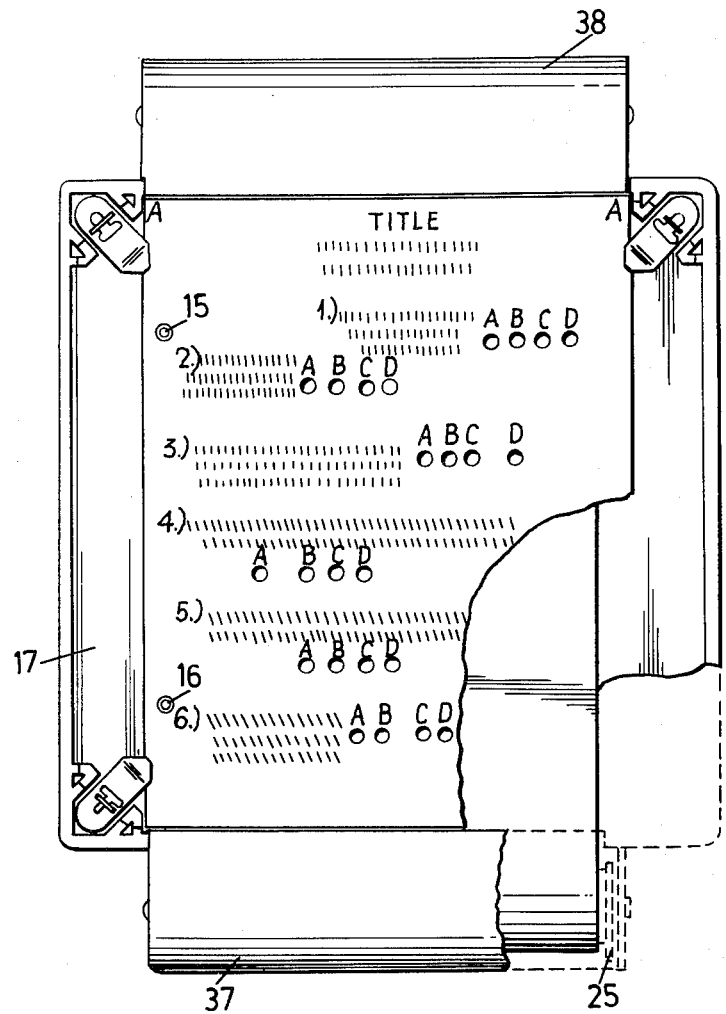
FIG. 4 is a top view of the apparatus, similar to FIG. 1 in all respects but one, and this is that the rollers are covered from the view of the student by a cover.

FIG. 4 is similar to FIG. 1 in all respects except for showing the lower right-hand corner as a cutaway view, and for showing a cover 38 over roller 24, and a cover 37 over roller 25.

Figure 5:
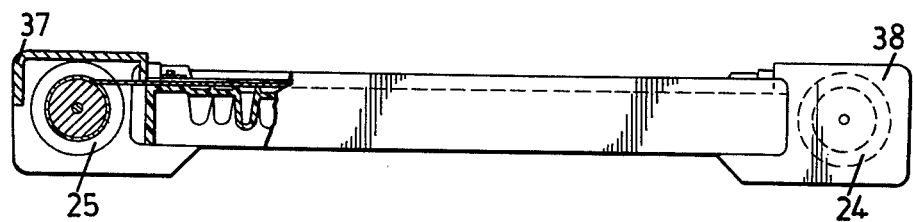
FIG. 5 is a side view similar to FIG. 3, but it reveals a cutaway view of FIG. 4 which shows the relationship of the cover to the roller, to the blank sheet, and to the holding frame.

FIG. 5 is similar to FIG. 3, except it shows a cover 37 over roller 25, and a cover 38 over roller 24. FIG. 5 is a side view of FIG. 4, revealing the side view of the cutaway section illustrated in FIG. 4.

Figure 6:
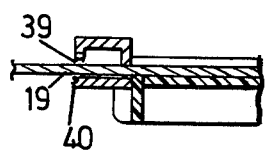
FIG. 6 is a modified version of the left-hand end portion of FIG. 5 in which the roller is omitted and replaced by means to facilitate tearing off excess paper.

FIG. 6 shows a modification of one end of FIG. 5. The roller 25 is omitted and replaced by means to facilitate tearing off excess paper, comprising adjacent serrated edges 39 and 40.

Figure 7:
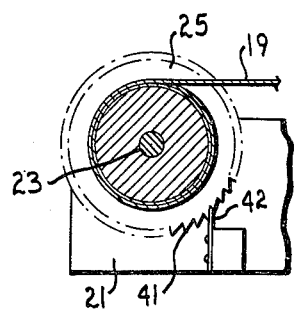
FIG. 7 is a fragmentary, cutaway, side view of the left-hand end portion of the apparatus of FIG. 3, showing a modification that prevents reversal of the take-up roller.

In FIG. 7, a ratchet wheel 41 is shown secured to one end of the roller 25 in axial alignment therewith. The wheel 41 turns with roller 25 in a counterclockwise direction as viewed in FIG. 7, and its teeth engage an anti-backup pawl 42 mounted within the frame of the holding mechanism 17. Accordingly, roller 25 is employed as the take-up roller and permits the registration sheet 19 to be incrementally advanced in one direction only (to the left in FIG. 7) so that a student cannot rewind the sheet 19 and obtain an indication of the correct answers by seeing the selections previously made by another.

Having thus described the invention, what is claimed as new and desired to be secured by letters patent is:

1. An instructional apparatus comprising:
    a holding mechanism provided with an upper surface having depressions therein of at least two different depths;
    a printed format presenting a holding margin and having holes therethrough inside said margin indicating answer choices,
    said mechanism having means engageable with said margin for holding said printed format on said upper surface in overlying relationship thereto with the holes in the format in alignment with corresponding depressions in said upper surface, said holes and said depressions being adapted to receive a stylus used by a student to make answer selections; and
    a blank response sheet freely sandwiched between said printed format and said upper surface and movable in a predetermined direction in increments therebetween, said sheet being narrower than said format transversely of said direction of movement to present opposed edges inside and clear of said holding means whereby, after holes are punched in the blank sheet by the student in making answer selections, the sheet may be repositioned to permit the sheet and said printed format to be reused.

2. The instructional apparatus as ciaimed in claim 1 and in which the blank response sheet is somewhat smaller than the printed format, and in which the blank response sheet is movable between the printed format and the upper surface of the holding mechanism by elevating at least one corner of the overlying printed format and manually repositioning the blank response sheet to permit multiple reuse.

3. The instructional apparatus as claimed in claim 1 in which the blank response sheet is of sufficient length so as to extend beyond two opposed outer edges of the holding mechanism, whereby the blank registration sheet can be repositioned after use by pulling on one of the edges of the blank registration sheet that extends beyond the holding mechanism so that the blank registration sheet can be advanced without disturbing or moving the overlying printed format.

4. The instructional apparatus as claimed in claim 1, wherein said blank response sheet is a part of a roll of paper, and wherein a pair of rollers are provided which take up and dispense the roll of paper, said holding mechanism having means mounting said rollers in proper alignment for the unimpeded passage of paper from one roller across the upper surface of the holding mechanism in said direction to the other roller.

5. The instructional apparatus as claimed in claim 4 and in which the rollers are obscured from view by a cover over each roller.

6. The instructional apparatus as claimed in claim 4, wherein anti-backup means is operably coupled with said other roller to limit its movement to one direction of rotation, whereby to prevent rewinding of said roll of paper so that the student cannot align previously made selections with the holes in said printed format.

7. The instructional apparatus as claimed in claim 1, wherein said blank response sheet is a part of a roll of paper, and wherein a roller is provided supporting said roll of paper and from which the same is dispensed, said holding mechanism having means mounting said roller in a position for the unimpeded passage of paper therefrom across said upper surface in said direction, there being serrated means mounted on said mechanism for receiving said paper after passage thereof across said upper surface to facilitate tearing off excess paper as the roll of paper is consumed.

* * * * *